JUVENILE VEHICLE BODY CONSTRUCTION

Original Filed June 29, 1959 8 Sheets-Sheet 1

INVENTOR
ALVIN P. DOUGLAS

BY Williams, Tilberry & Golrick
ATTORNEYS

JUVENILE VEHICLE BODY CONSTRUCTION

Original Filed June 29, 1959 8 Sheets-Sheet 2

INVENTOR
ALVIN P. DOUGLAS

BY Williams, Tilberry & Sobrick
ATTORNEYS

INVENTOR
ALVIN P. DOUGLAS

BY Williams, Tilberry & Gobrick
ATTORNEYS

JUVENILE VEHICLE BODY CONSTRUCTION

Original Filed June 29, 1959 8 Sheets-Sheet 4

INVENTOR
ALVIN P. DOUGLAS

BY Williams, Tilberry & Gobrick
ATTORNEYS

JUVENILE VEHICLE BODY CONSTRUCTION

Original Filed June 29, 1959 8 Sheets-Sheet 5

INVENTOR
ALVIN P. DOUGLAS

BY Williams, Tilberry & Gotrick
ATTORNEYS

JUVENILE VEHICLE BODY CONSTRUCTION

Original Filed June 29, 1959 8 Sheets-Sheet 6

INVENTOR
ALVIN P. DOUGLAS

BY Williams, Tilberry & Gabrielle
ATTORNEYS

JUVENILE VEHICLE BODY CONSTRUCTION

Original Filed June 29, 1959 8 Sheets-Sheet 7

INVENTOR
ALVIN P. DOUGLAS

BY Williams, Tilberry & Gabrielsen
ATTORNEYS

JUVENILE VEHICLE BODY CONSTRUCTION

Original Filed June 29, 1959 8 Sheets-Sheet 8

INVENTOR
ALVIN P. DOUGLAS

BY Williams, Tilbury & Gatrick
ATTORNEYS

United States Patent Office

Re. 25,382
Reissued May 7, 1963

25,382

JUVENILE VEHICLE BODY CONSTRUCTION

Alvin P. Douglas, Nashville, Tenn., assignor to The Murray Ohio Manufacturing Company, Nashville, Tenn., a corporation of Ohio Original No. 3,036,857, dated May 29, 1962, Ser. No. 823,754, June 29, 1959. Application for reissue Dec. 14, 1962, Ser. No. 246,299
16 Claims. (Cl. 296—28)

Matter enclosed in heavy brackets [ ] appears in the original patent but forms no part of this reissue specification; matter printed in italics indicates the additions made by reissue.

The present invention is concerned with a juvenile vehicle body construction and a method of fabricating the same, and more particularly with improvements in the structure and fabrication of a sheet metal body for a juvenile vehicle.

In juvenile vehicles of the type which are usually steerable and pedal driven by a young rider accommodated therein, for customer acceptance there is required a body construction which is not only rugged and durable in use, but which also has a clean appearance in construction details as well as over-all form. Of course, a comparatively low cost is also highly desirable.

Prior structures and manufacturing methods for these sheet metal bodies, comprising a plurality of body components or sections have generally involved a final body assembly having extended welded joint lengths in readily visible external locations. One consequence of this condition has been that considerable labor has been required in assembling the body in warping or fitting for welding where the shape of the components in the joint regions varied from strict complementary form; for example resulting from wear in the dies used in forming the components, or from distortion in handling the components; and then further labor in cleaning up the joints to give an acceptable external appearance. Some of the prior structures moreover have required considerable hand labor in breaking or forming a main body partially formed by machine die forming operations into final form about a buck for the final assembly, which again gave rise to a step in fabrication where variations of shape could and did arise with the aforementioned disadvantages.

It is the general object of the present invention to provide a sheet metal body construction and also a method of fabricating the same meeting commercial production requirements. A more specific object is the provision of a sheet metal body construction and a method of fabricating the same wherein the formation of the body components may be carried out into the finished form of each by usual machine operations of metal forming. A further object is the provision of a body construction and method of fabrication wherein a main body component providing in one piece front and rear fenders with connecting side panels and a hood, a front panel member providing a transverse structural element and closure for the front of the main body member, and back end closing and transverse reinforcing components may be brought together in a final vehicle body with a minimum of external or visible joints; and whereby the individual body components and final assembly of the same may be carried out with a minimum of hand operations, while at the same time obtaining in the final vehicle body a neat appearance and rugged structure at a minimum cost. A still further object is the provision of a basic body construction and method of fabricating the same including a main body portion of the character above described and a front panel component, along with a seat component as a portion of the rear body structure, which is readily adapted to a change in type of rear appearance primarily by use of various forms of external rear elements.

Other objects and advantages will appear from the following description and the drawings wherein.

Figure 2:
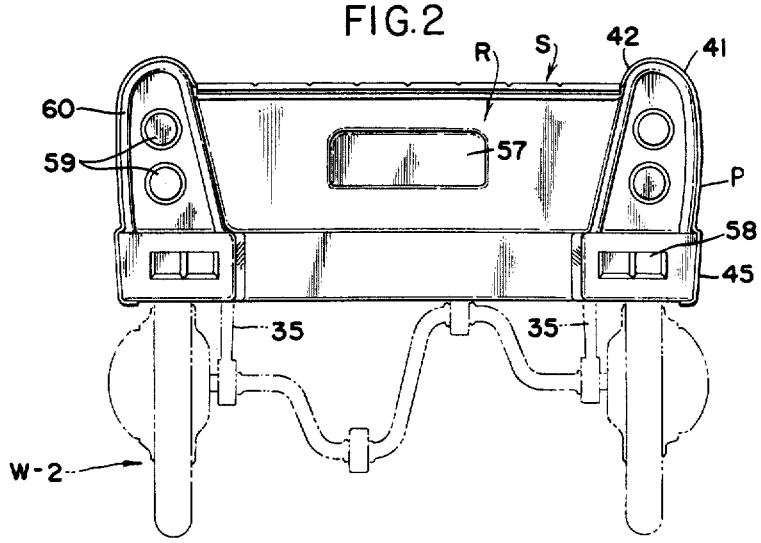
FIG. 2 is a rear elevation of the body shown in FIG. 1.
Figure 1:
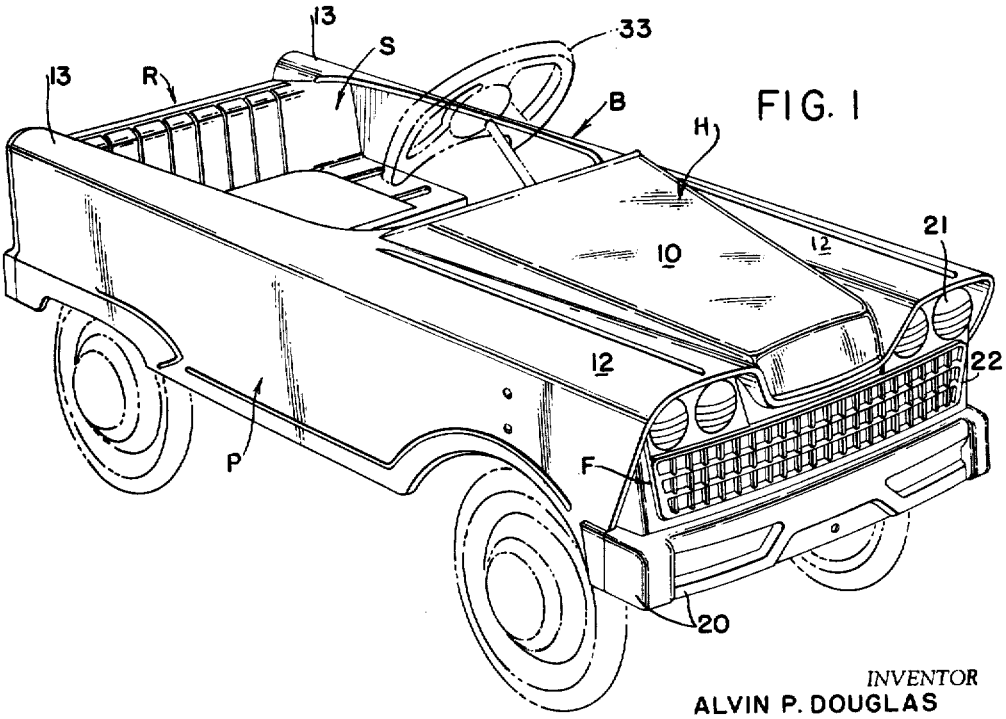
FIG. 1 is a perspective view from the right front end of a juvenile vehicle body produced according to and embodying the present invention; with the vehicle wheels, steering column and wheel being shown in dashed outline.
Figure 3:
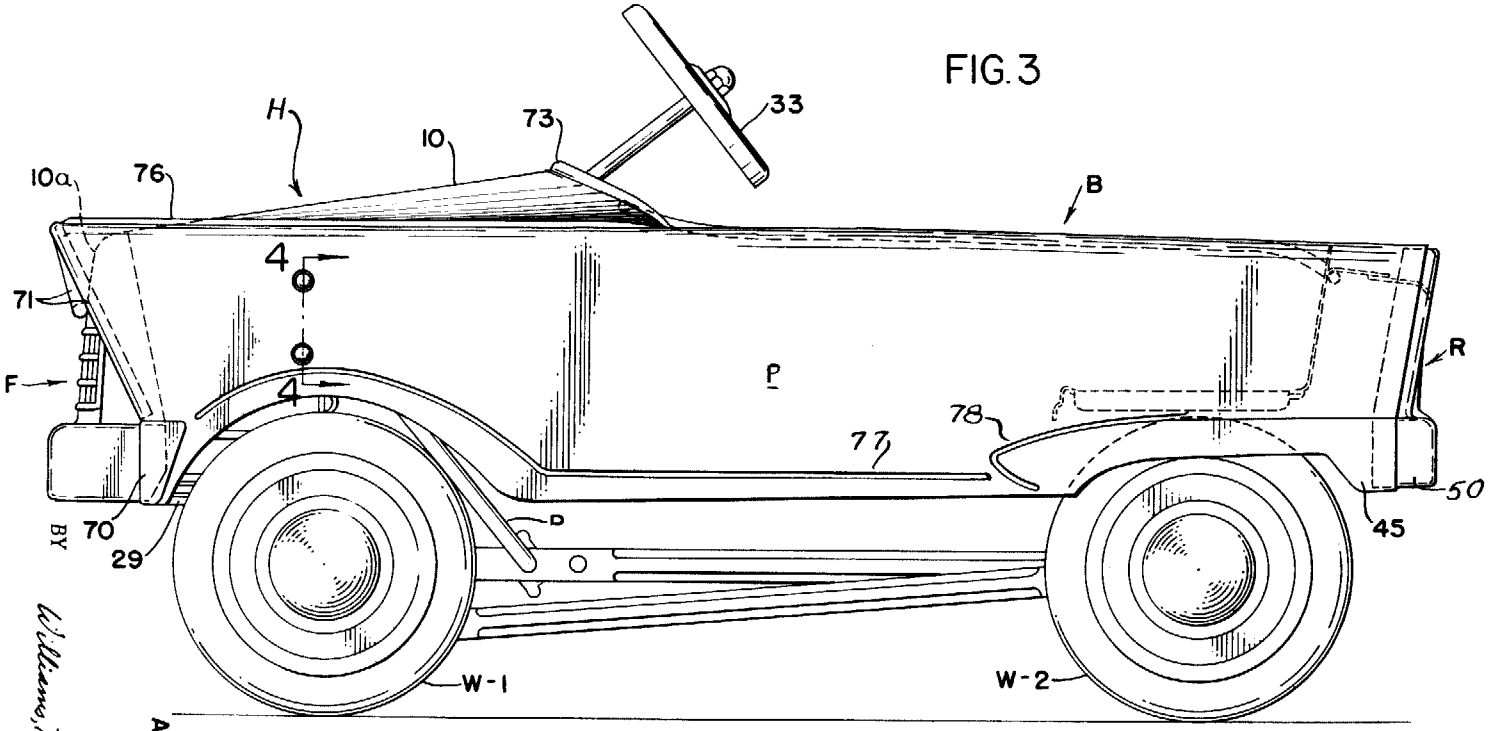
FIG. 3 is a left side elevational view of a complete pedal-driven type juvenile vehicle incorporating the body structure of FIGS. 1 and 2.

The general typical arrangement of the parts of the juvenile vehicle body according to the present invention is seen in the perspective view of FIG. 1; comprising the main body component B extending longitudinally over the entire length of the vehicle, a front panel member F, an L-shaped seat piece S, and means terminating the back such as the rear panel R more clearly seen in FIG. 2. The main body member B includes in an integral component, a hood formation H and depending skirts or side panels P; the latter extending over substantially the entire length of the vehicle (see also FIG. 3) and curving upwardly and over into the top regions 12 and 13 to provide front and rear wheel wells and fender formations, and also defining with the dash board formation 15 (see FIG. 5) the front and sides of a rider's space. The front panel member F, including formation simulating an auto bumper at 20, radiator grill work at 21 and headlights at 22, welded to member B to complete the front end of the body per se as a front closure and structural beam element, is hereinafter described in detail for its form, function and relation to member B, but it may be here noted that no seam or joint area is visible except at the bumper side regions.

Behind the front panel, the front fender regions of the side panels provide clear space for affixing at each side a transverse beam-like rigid plate member 25 through end flanges 26 conformed to the slight side panel vertical curvature by rivets 27 received in formed side panel recesses 28. The beam member 25, serving as part of the mounting for front steering wheels W–1 and steering gear mechanism and for the front part of the driving mechanism D, may for example be that disclosed in the Douglas-Walter U.S. Patent 2,660,448. The body construction affords ample space for such mechanism as well as an associated forward brace 29, anchored to the rear of panel F because of the rigidity of the latter; and with proper spacing for support in a flanged opening of panel 15 for the upper part of the steering column wheel 33.

At the back portion of the body, the rear fender or wheel well regions again afford clear space for welded attachment of a transverse body rigidifying member, here the extended longitudinal edges of the seat member S, and the rear panel member R in telescoped welded relation with the separate ends of the rear fender portions of member B also provides a further rigidifying structural member as well as closing off and completing the back of the body; all as hereinafter detailed. The under side of the seat bottom then serves as a rigid area for attachment of a rear axle hanger 35 for mounting a driving crank axle and rear wheels W–2, such for example as disclosed in Douglas-Walters U.S. Patent 2,633,371.

Figure 5:
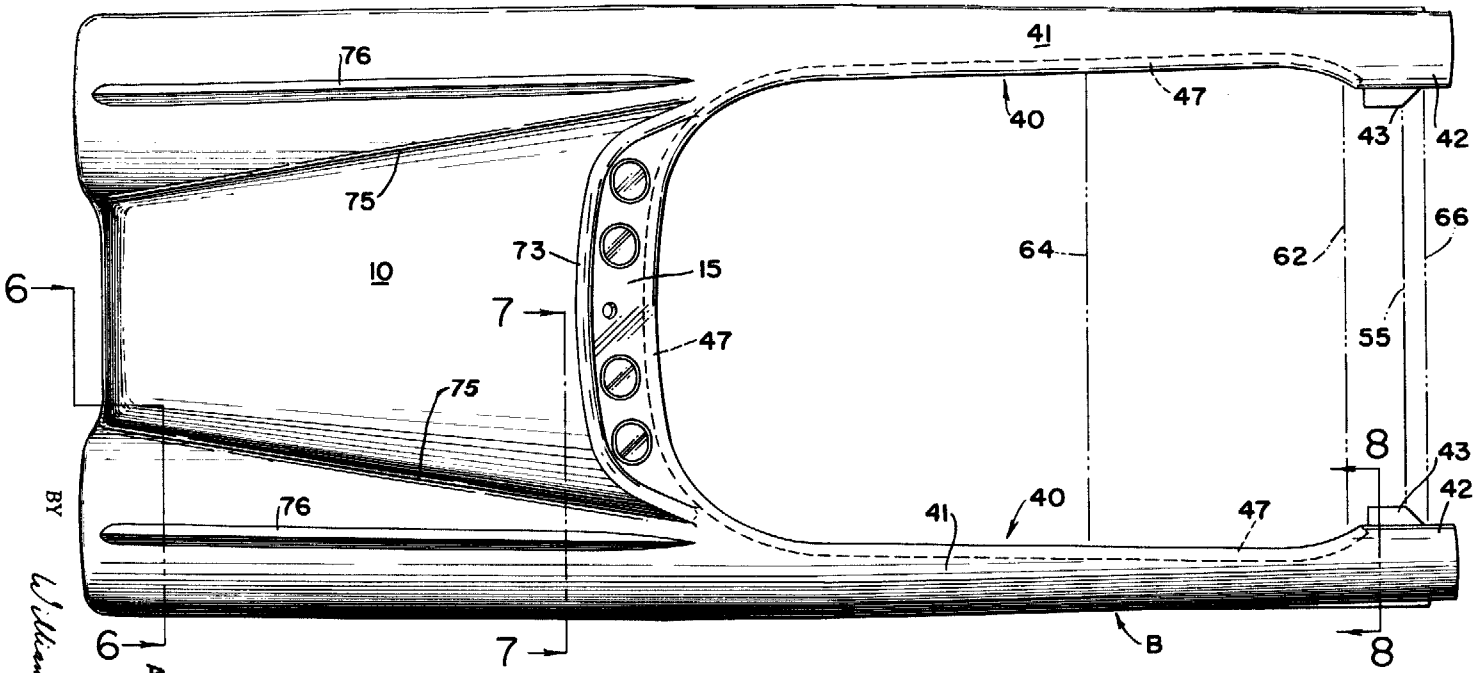
FIG. 5 is a plan view of the main body component ready for assembly.

Considering now the details of the body structure, the shape in plan of main body member B may be gathered from FIG. 5. As the vehicle, so the main body portion and the several other principal elements of the body, are symmetrical relative to a vertical longitudinal center plane through the vehicle as a whole. The hood and front fender portions occupy somewhat less than half the length of the body, and rearward of the panel 15 sloped rearwardly and downwardly from the hood, two relatively narrow rearward legs or extensions 40 define a roughly U-shaped opening for the driver space, the depending skirts in this region being rounded over in coming up to the top area 41 along the inner margin of the opening.

At the rear, free ends of the extensions 40 are completely curved over the top region and downwardly along the inner margin at 42 to terminate in a flat inwardly extending tab or flange 43, while along the bottom edge of the side skirt, a shallow inwardly open recess or channel is formed by the outwardly offset portion of metal 45 and inturned bottom flange 46. (See FIG. 8, a vertical section taken substantially along 8—8 in FIG. 5, on the left extension.) The bottom flange 46 is continued over the entire bottom edge of each side panel from the rear to the front, following the recesses or upward edge notches at wheel locations to finish off and stiffen the free edges of the body. An inwardly curled edge roll or tubular bead 47 is formed continuously around the entire seat space opening from the forward edge of the curled over portion 42 on one side to that on the other, again finishing off and rigidifying the free edge of top areas 41 and of the dash panel formation 15. The bead is carried slightly inwardly and downwardly in coming to a termination in the curled downward portion 42 terminating near the forward end of the flange 43.

Figure 14:
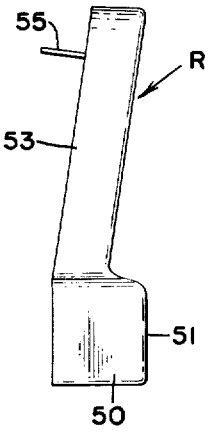
FIG. 14 is a left side elevational view of a rear panel forming a rear closure for the main body member.
Figure 15:
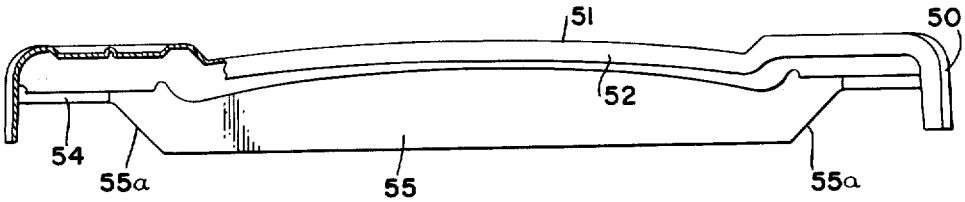
FIG. 15 is a bottom view of the rear panel member corresponding to FIG. 14, with a portion broken away.
Figure 16:
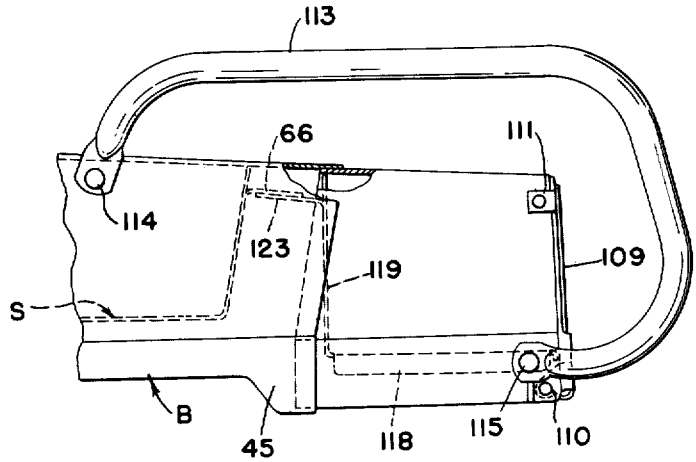
FIG. 16 is a fragmentary left side elevational view of a modified rear end portion of the vehicle body, showing the adaptability of the basic body structure to production of differing back end body styling.
Figure 17:
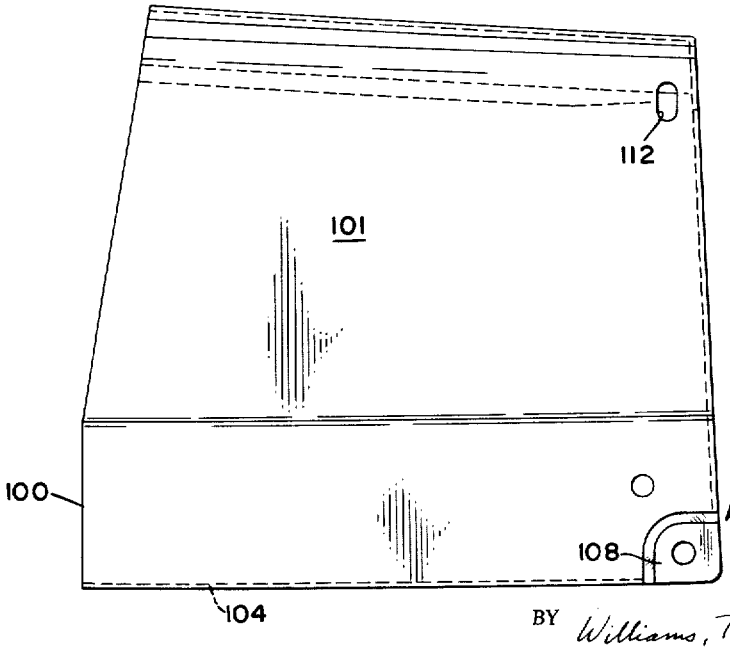
FIG. 17 is an enlarged side elevation of a fender extension piece included in FIG. 16.
Figure 18:
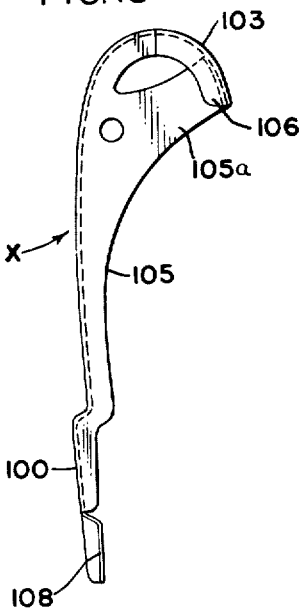
FIG. 18 is a rear elevation corresponding to FIG. 17.
Figure 19:
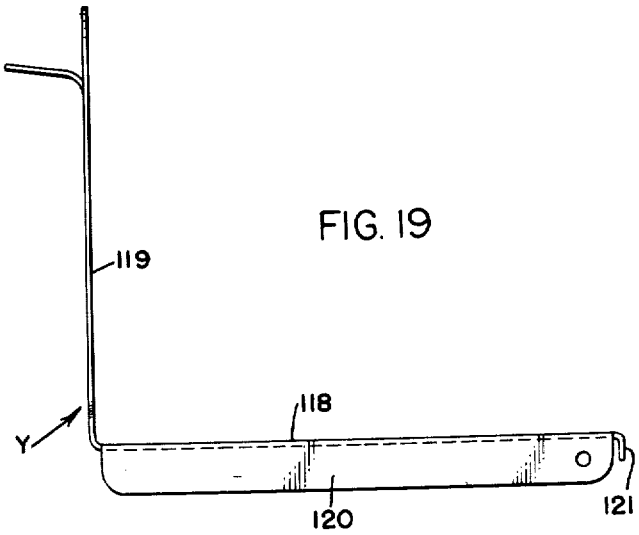
FIG. 19 is a left side elevation of an element of the structure of FIG. 16.
Figure 20:
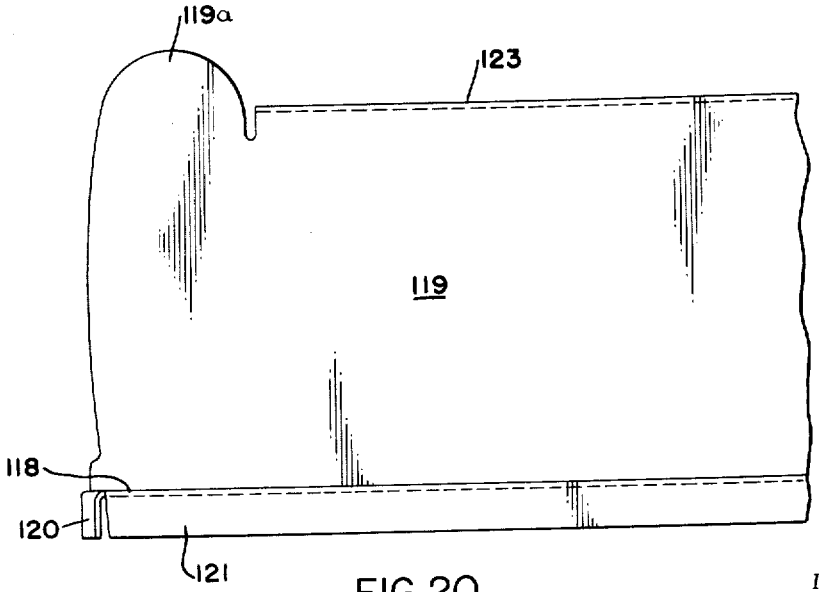
FIG. 20 is a fragmentary rear elevation corresponding to FIG. 19.

The general form in rear elevation of rear panel member R is seen in FIG. 2; in side elevation in FIG. 14 and in a bottom view of FIG. 15. At the short sides 50 and along the rear at 51 the bottom portion is bulged outwardly to simulate an auto bumper, to provide a channel-like region actually serving as a bumper function by affording an outwardly projecting strengthened formation, less damaged by collision, and to provide a keying or interfitting relation of the side bulges 50 slid into the correspondingly shaped recesses 45 at the rear portion of the member B, somewhat analogous in this detail to Kraeft U.S. Patent 2,633,378. Hence, the inward finishing and strengthening flange 52 extends entirely across the bottom of the rear panel to be carried forward along the side formation 50. In rear elevation outline (see FIG. 2 and compare FIG. 8), the shape of R is conformed at each end to the interior of the main body member extensions 40, along 46, 45, 41 and 42 and then running generally straight across between and at the slope of flanges 43 on B. A forwardly, i.e., inwardly, directed continuous flange formation provides the previously described side bulge formations 50, thereabove the flanges 53 extending up respective the sides then continuing over the top in the curved top flange at 54, which meet and continue into a generally transversely straight upwardly sloped top flange 55. The top flange 55 with pronounced forward extension, in addition to its slope accommodated to the adjacent flanges 43, has at each end an inwardly sloping or mitred edge **55*a* corresponding to rear mitred edges of the flanges 43** of the body member.

Accordingly, the body member B in the form of the terminal portions of the rearward extensions 40, and the outline shape and edge flanges of the rear panel member R are mutually adapted in shape so that the latter may be partially telescoped into said rear extensions to provide extended overlapped areas for spot welding the two body elements together. Moreover, due to the relative independence of the rear ends of body member B and to the relatively small proportion of the periphery of the rear panel R that is interfitted therewith, it is relatively easy to obtain a closely conformed overlap of the metal in B with R for close clean joints in spot welding.

In the rear panel member includes formations primarily decorative, as a license plate feature at the area 57 simulated tail pipe openings or exhaust openings in the bumper at 58, tail or stop lights at 59; and others rigidifying and strengthening the panel as well as having decoratvie features, as the inverted U-shaped beads 60, along with a general slight outward convexity or bowing.

Figure 12:
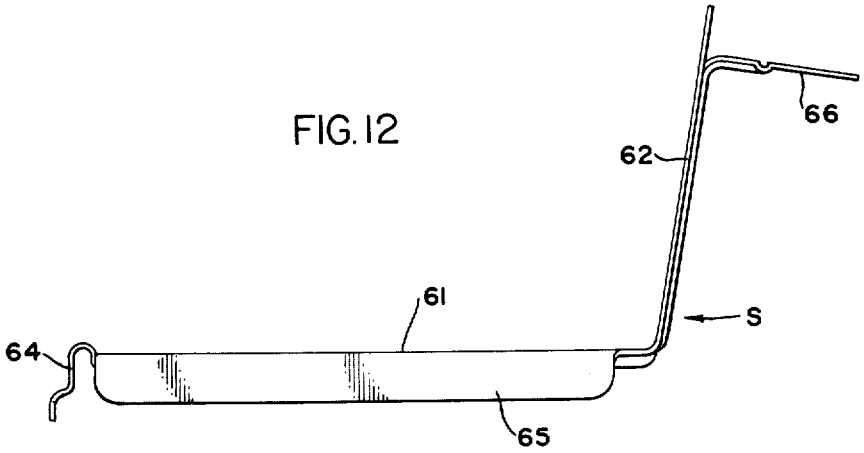
FIG. 12 is a side elevation of the seat member forming a structural element of the body taken at the left of the vehicle.

The seat member S, generally L-shaped in side elevation, (FIG. 12) includes a generally horizontally extended bottom portion 61 and a slightly inclined back portion 62, both generally flat, but as here shown preferably having spaced rib formations primarily for structural reinforcement. In addition to the downward finishing and rigidifying flange formation 64 across the entire straight front edge, the seat bottom portion has downward side flanges 65 conformed lengthwise to the inside regions of the side panels of main body member B (here having a slight inward curvature converging toward the rear as seen in FIG. 5) to furnish mating seat and side panel surfaces for spot welding the seat member S rigidly in place and thereby also form a transverse beam over a major portion of the rider space.

Figure 13:
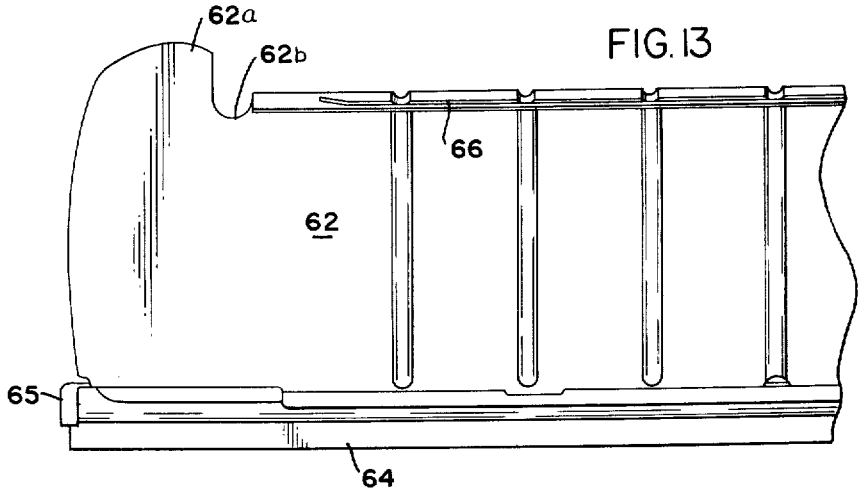
FIG. 13 is a rear view corresponding to FIG. 12.

The side edges of the seat back portions (see FIG. 13) including upward projections 62a at each end are generally conformed to the curvature of the interior of the body member in corresponding location, so that when the seat member is secured in place, a complete closure across the back of the rider space is provided; while the transversely straight top between the two projections 62a is reflected rearwardly in a generally flat sloped flange 66, overlapping in final assembly the body flanges 43 and the forward edge of the rear panel member top flange 55. Inside the projections 62a, semi-circular notches 62b accommodate the inwardly and downwardly curved end portions of the rolled edge 47 terminating in concealed location behind the seat back 62. The dashed lines 64 and 66 in FIG. 5 indicate in plan the total extent of the seat; and dashed lines 66, 55 also indicate the above-described overlapped relations of flanges 43, 55, 66 affording further areas where the seat member at back flange 66 is welded to the top surface of the respective flanges 43 at its side margins and to the forward top surface of the flange 55 over the entire rear extent, thus further reinforcing the entire rear portion of the body.

Considering now the front end structure (see FIGS. 1 and 3) broad shallow inwardly facing channels or socket formations 70 are again provided for reception of bumper side formations 20a of the front panel; and a continuous inward roll formation 71 follows the forward edge of the front fender regions of side panels P sloping forwardly and upwardly to and crossing the flattened front fender top arches, and then sloping slightly inwardly and downwardly to a transverse middle portion bounding the downwardly sloping central front area 10a of the hood.

Figure 6:
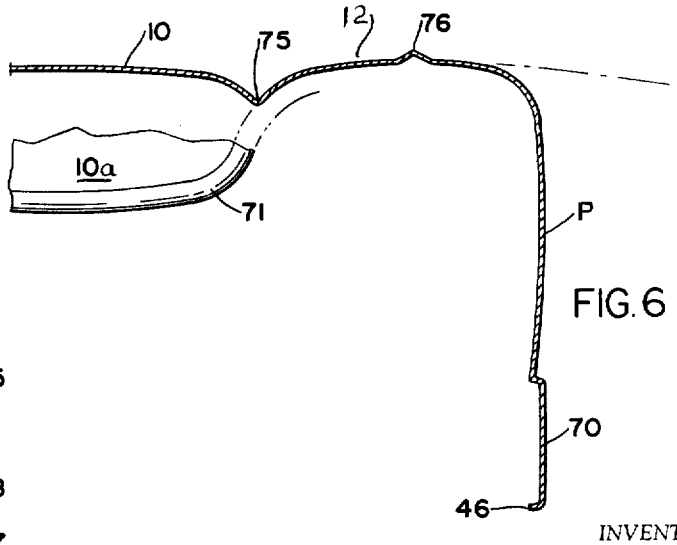
FIG. 6 is a fragmentary view partially in vertical transverse section through the forward portion of a fender and the hood taken as indicated at line 6—6 in FIG. 5.
Figure 4:
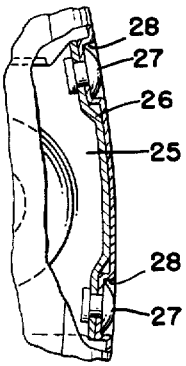
FIG. 4 is a fragmentary detail in section taken at the line 4—4 of FIG. 3.

The raised rib 73 at the top and rearwardly sloping sides of the dash 15, and the straight valleys or depressions 75 beginning with a slight depth outside the dash region to deepen and converge toward the sloped front 10a, define a hood top area 10. The hood top has a generally straight longitudinal slope from 73 to 10a (see FIGS. 1 and 3). In a transverse direction, the major extent of the hood top 10 has a slight convexity which rounds off more sharply marginally into the depressions 75, the marginal slope or curvature decreasing from rear to front as appears from the sections of FIGS. 7 and 6. Accordingly, the transverse dimension of the slightly arched front fender top areas 12 increases from rear toward front (FIG. 5). Outside the generally parallel upwardly formed decorative ribs 76, in a region aligned with or a continuation of the areas 41, the tops of the front fenders curve downwardly into the side skirt regions.

Figure 11:
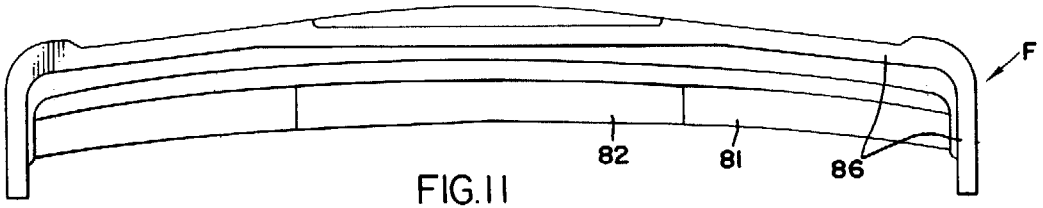
FIG. 11 is a bottom view corresponding to FIG. 9.
Figure 9:
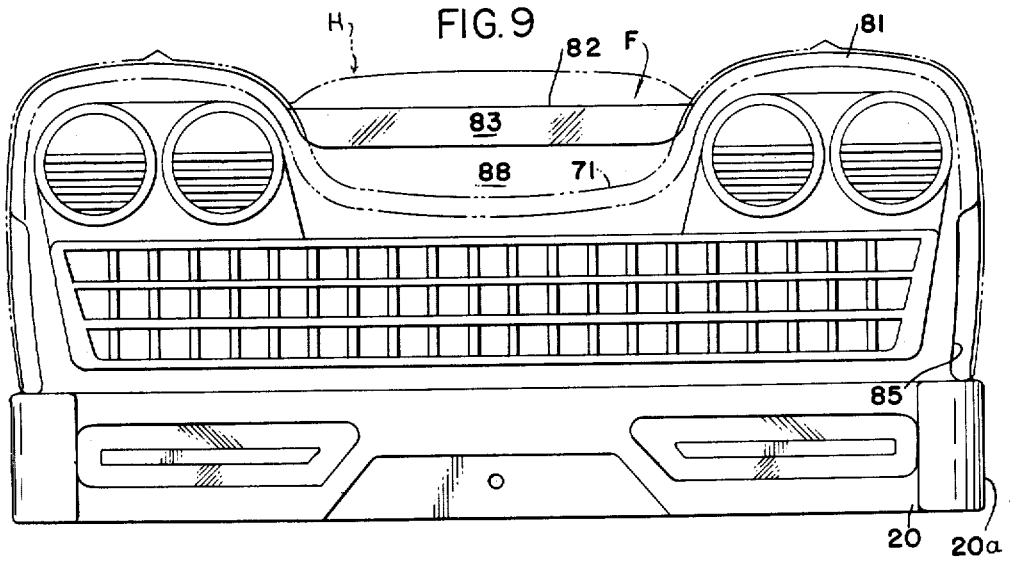
FIG. 9 is a front panel member serving to close the forward end of the main body member in a transverse beam fashion.
Figure 10:
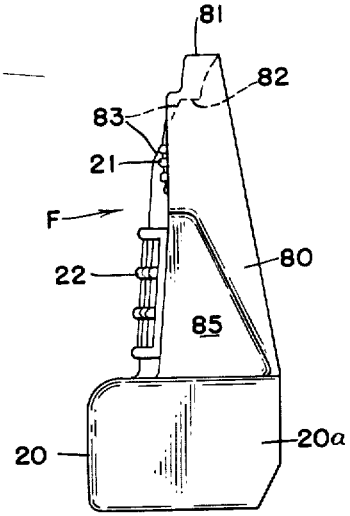
FIG. 10 is an end elevation at the right of FIG. 9, the left side of the vehicle.

In addition to the structural strength and rigidity conferred on member B by the various formations therein, the front panel F (see FIGS. 9, 10, 11) is, of course, particularly important as a transverse beam structure in the body. In the front elevation of FIG. 9, the dashed outline of adjacent parts of the body member B indicates the relation of the members B and F and the conformity of the sides and top of F to the interior of B. The bumper formation 20 is carried around sideways into rearward extension 20a shaped to partially telescope and key into the channel formations 71. The rearwardly extending side or end portions above and continuous with the back margin of 20a have side flange areas 80 continuing into top flanges 81 which drop down to join opposite ends of a generally straight transverse central flange 82. The described continuous flange being conformed at 20a, 80, 81 to the interior or member B, again offers an extended area of contact between the front panel member and the main body member B for spot welding the two into a rigid structure. Also (see FIGS. 9 and 10) at the top central portion of member F below the rearward flange 82 there is a forwardly, downwardly sloping generally straight flat area 83 with inclination conformed to the hood front formation 10a, providing further spot welding area at the center region. Above the bumper formation rather sharply inset triangular areas or recesses 85 accommodate the inclined roll 71 at the ends of F; and a bottom flange 86 also finishes off the entire bottom extent of the bumper formation.

Now when member F is placed in position in the front of the body member B, as in FIG. 1, with the sloped area 83 contacting the back of 10a, with the bumper side formations 20a received in the channels 70 at the bottom of the main body section and with the sloping side parts of roll 71 accommodated in the recesses 85, all of the joint areas between F and B above the bumper are concealed, since the top of F is spaced behind the front top edges of the fenders, and the depressed hood front comes down in front of the panel areas 83—88.

It should be further noted that in the lengthwise or longitudinal region where the side panel curves upwardly into the top portion of the body, both in the rear fender region or in the extension 40 and also in the region of the forward fender top formations 12, the body is kept free of all decorative and structural formations except at the front bead 71, for the purposes of fabrication method hereinafter detailed.

FIGS. 16–20 offer an example of the adaptability of the basic body structure of this invention for other body styles, involving variations in the rear structure. In the side elevation of FIG. 16 the body style is modified by extending the body at the rear by use of fender extensions X, but member B, front panel F and the seat member S are in all details similar to those previously described. Each fender extension member X (appearing for the left hand form in FIGS. 17 and 18 in side and rear elevations) is shaped to conform to the interior of, and carry out rearwardly at the side 101 and curved top 103 the general lines of, the rear fender portion of the body member B previously described. Along the bottom, the extension member has an outwardly offset or bulged formation 100 inwardly flanged at 104 and shaped like the rear bumper 50 of the previously described rear panel member R; whereby the same is adapted to key or fit in the corresponding formation 45 and carry out rearwardly the line thereof to the back of the vehicle, whereby the forward edge of X may be telescoped and spot-welded in the opening of the rear fender portion of member B. The back edge of X has an inward flange 105 running up the side to the top which includes strut-like arm 105a spanning the rear opening and welded inside the flange 106.

A tail gate 109 is pivotally attached through ears 110 at the perforated inset corners 108 of the fender extension and has latching ears 111 for engagement with slots 112; and at each side a bent tubular hand rail member 113 is secured through flattened front and rear ends by bolts or rivets 114, 115 to B and X, to provide in conjunction with the added rear fender length a marked difference in style appearance of the vehicle. To close in the back region of the seat at the rear and also to provide a luggage space, between the fender extensions there is secured the generally L-shaped member Y comprising a generally flat horizontal floor portion 118 and an upright front 119, and like the seat member having downward spot welding flanges 120 along each side of 118 conformable to the interior of sides 100 on members X, and a back flange 121 both for safety and rigidity of the floor panel 118. The opposite ends or side margins of the generally flat upright front 119 is again shaped to conform to the interior of the extensions against which it abuts, and between the upward projections 119a includes a forwardly directed flange 120 similar in size, shape and disposition to the top flange 55 of the member R. The forward flange 123 accordingly fits beneath and is spot welded to the rearward top flange 66 of the seat member, the flange 123 again lying in a common plane with the flanges 43 of the body and having mitred corners abutting therewith. The tailgate 109 may be generally flat and provided merely with shallow decorative formations in imitation of a bumper, stop lights and tail lights rather than heavily drawn features since 109 is not a stress bearing element.

The method of fabricating the main body component, member B, comprises six principal steps. In a first blanking die operation, a flat blank of suitable size is formed from sheet metal such, for example, as 22 gauge 1010 cold rolled steel for a final body about three feet long, 15 inches wide and 8½ inches high, the blank having excess marginal material for engagement by hold-down bars or other clamping devices in subsequent die forming operations. In a second step, the hood formation 10, 10a, the identations or valleys 75, the ribs or ridges 76, and the curved rib 73 along with the dash panel formations at 15 are completely formed by a draw die forming operation, and at the same time the side panel areas of the blank are given slight curvatures transversely and lengthwise corresponding respectively to the slight convexity appearing in vertical direction over the entirety of each side panel and over the entire length thereof. The inward curvature at 42 at the back ends of the extensions 41 are likewise formed in this operation. However, on each side of the drawn blank outward from a line extending backward through a rib 76 to the curved region 42, the metal has only the slight downward curvature corresponding to the aforementioned side panel vertical curvature, so that the blank still extends generally in a horizontal direction relative to the much more deeply drawn central region of hood and dash.

In a third operation, the metal is completely sheared out of the drawn blank at the central portion which will ultimately become the cockpit or rider space; and simultaneously the wheel housing or fender openings at front and rear and all the excess marginal metal engaged by hold-down bars in previous operations are sheared away to produce a drawn trimmed blank of final dimensions.

The channels or recesses at 45 and 70 of the blank for receiving the rear and front bumper formations are die formed in a fourth operation along with the two inward ribs or grooves 77, 78 spaced inwardly along each edge of the blank, (in the final body running over the front fender opening and along the side, and above the rear opening respectively). In a flanging operation as the fifth die-forming step, the inward flange 46 is produced along the entire side margins of the blank; and the metal is also flanged across the entire blank front and along the margin of the seat opening partially to form the metal for the rolls 71 and 47 respectively; the rolls 47 and 71 being completed in a sixth operation of curling, giving a "finished" blank, which is still generally horizontally extended, as indicated by the direction of the dashed lines in FIGS. 6, 7, 8.

Figure 7:
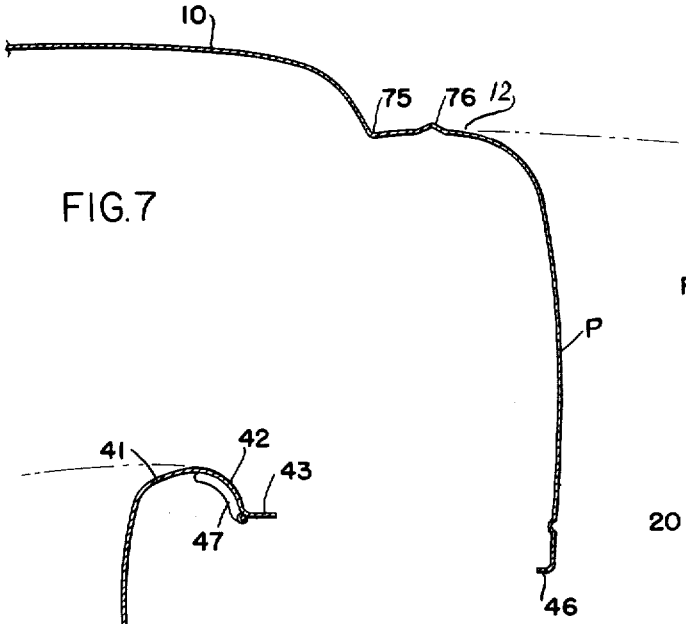
FIG. 7 is a vertical transverse sectional view showing in outline form the shape of the main body member at the line 7—7 in FIG. 5.
Figure 8:
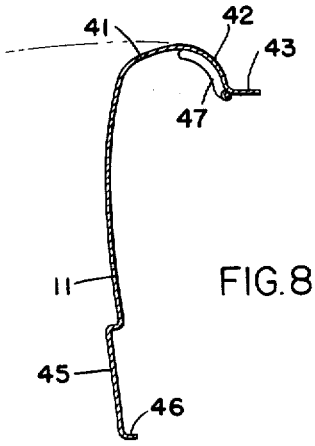
FIG. 8 is a vertical transverse section through a rear fender portion of the main member taken as indicated at 8—8 in FIG. 5.

In the seventh or final die forming operation, the finished blank is broken or bent downwardly at each side along its entire length, in the region kept clear inside the edges for this very purpose of any transverse beading or other type formations, the entire side length therefore being brought down into a final position for an inverted U-shape corresponding to that shown in the drawings in FIGS. 7 and 8. Although a central aperture in panel 15 for the steering column can be provided in one of the earlier steps, along with the apertured recesses 28 for plate 25 and other holes for mounting accessories, these preferably are made after the overall shape of member B is completed by localized operations not involving the dies working larger areas of the blank.

The front and rear panels F and R and the seat member S are formed by any suitable sequences of sheet metal forming operations involving blanking, drawing, trimming and flanging to the final forms shown. Since the metal forming operations described for members B, S, F and R as such are generally well known and their techniques widely used, no further details thereon are here supplied. The last named three members may be formed of sheet metal similar to that of the body, although it is preferable that the seat member be somewhat heavier, say 20 gauge metal in the body example given.

At the front end of the asesmbly, after the top end of the front panel member F has been brought up under and spaced behind the curled or rolled formation 71 with the center region behind the inclined central hood portion 10a and the bumper side formations 20a fitted and keyed into the channels 70, the abutting surfaces are spot welded from the bottom at the sides and over the tops to the depressed front region, and also at a few locations between the inclined central regions 83 and 10a.

Before final assembly advantageously the rear panel member R and seat member S are spot welded together along the regions of the overlapped flanges 55 and 66 to provide a sub-assembly. The sub-assembly is then located in the rear opening of B with the end portions of R inserted in the ends of the extensions 41 of the body, and the overlapped regions are spot welded, aptly beginning at the bottom and working toward the top, with seat flange 66 finally spotted onto the flanges or tabs

43. In this operation the outer bumper formations 50, received in the channels 45 of the main body member, aid the assembly operation by their interlocking or keyed relation in accordance with the Kraeft Patent 2,633,378. The side flanges 65 of the seat member S are then located in precise position relative to the sides of M and spot welded thereto.

Thereafter, the transverse beam plate 25 is riveted into position, and the entire body may be dip or spray painted as desired, before assembling the steering mechanism, drive mechanism and wheel in conventional fashion. Alternatively the seat member and rear panel may be individually assembled to the body member B and any desired order of assembly of F, R and S is possible.

With the aforedescribed body construction and method of fabrication, it is noted that not only the seat and panel members but also main body member B can be completely formed by metal die forming operations, since all structural or decorative formations in the blank for B are located outside of the lines for the longitudinal break at each side. This eliminates the step of hand wrapping or breaking of a partially formed body blank about a buck or jig as a step preliminary to assembly and welding of other elements thereto. Moreover, the assembly of the disclosed structure may be carried out without jigs.

Since readily visible joints between B and R occur only in bumper side regions, attainment of an excellent fit or complementary shaping of the entire side and top periphery of the front panel member relative to corresponding inner surfaces of the main member is not such a concern in fabricating as with prior bodies. This is important since distortion of completed components or die wear can lead to some variation in the fits. Prior methods and constructions with extended visible joints between components, particularly in the front or hood region required either expensive die maintenance or replacement, or considerable finishing or clean-up operations along the joint region or both. Also since with some prior practices, manufacturing tolerances varied either with die wear or later handling distortion of components, the assembly was more difficult and more time consuming for attainment of acceptable joints.

In the back end structure, the joints between the seat and main member are generally well concealed since entirely within the cockpit; and the joints there present occur between relatively flat seat flanges and correspondingly flat regions of the body member. At the rear panel, the joints to the main member are each relatively limited at either side. Hence, any required local deformation of the main member to the telescoped panel is easily achieved at each side over a relatively small region, since the fitting of the metal on one side is entirely free and independent of that on the other, thereby facilitating the entire operation. In consequence, each of the localized joints between the rear panel member and the main body member are the more satisfactory in appearance and readily attained.

It is further to be noted that the basic body structure—main member, front panel seat, and rear closure for the latter—is still present in the modified form of the vehicle type such as that appearing in FIGS. 16–20; and further that the incorporation or assembly of the fender extensions to the main member with acceptable joints is quite easily achieved.

I claim:

1. In a drawn sheet metal juvenile vehicle body, a basic body structure comprising: a one-piece main body member including a drawn hood formation and extending laterally therefrom front fender top regions, said main member having generally parallel side panels dependent from said top region to define therewith front wheel wells and fenders, narrowed portions of the said top regions and also said side panels being extended rearwardly beyond the hood to provide rear wheel wells and fenders and to define therebetween a rider space; a drawn front panel member having side and top margins generally conformed to the interior of said main body member and provided with edge flanges abutting the interior of at least said side panels and fender top regions, the top margin and major extent of the side margins being spaced rearwardly from the front edge of the main member, said flanges being spot welded to the main member to secure the panel member as a front closure and transverse beam element of the body; a roughly L-shaped one-piece seat member having an upright back with a rearward top flange, said back being conformed at opposite sides from said top flange toward the bottom to the interior shape of said side panels and said narrowed portions, said seat member also having a forwardly extending bottom with dependent side flanges conformed to and welded to the side panels as a transverse beam member, said top flange being welded to said narrowed portions; and means for closing the back of said body member rearward of said seat back.

2. The structure of claim 1, wherein said main member has a centrally depressed front portion and has along its front edge a continuous inward roll formation extending upwardly along the side panels over the front fender top regions and across said depressed front portion of the hood formation to aid in concealing the region of abutment of the front panel with the main member.

3. The structure of claim 1, wherein said means comprises a drawn rear panel member having forwardly flanged opposite ends conformed and welded to the interior shape of the back ends of the rearwardly extended side panels and narrowed portions, said rear panel member having a straight transverse top flange extending forwardly under and welded to the top flange of the seat member.

4. The structure of claim 3 wherein the front and rear panels have bumper simulating outward formations carried around the ends thereof, and the front and rear edges of the side panels have inward channel formations adapted to receive the bumper formations at the ends of the panels.

5. A structure as set forth in claim 1 wherein the areas between the side panels and the front fender top regions and said narrowed portions [is] *are* devoid of drawn formations in the metal.

6. In a drawn sheet metal juvenile vehicle body, a basic body structure comprising: a one-piece main body member including a drawn hood formation and extending laterally therefrom front fender top regions, said hood formation terminating rearwardly in and transversely rigidified by an integral rearwardly sloping dash board formation, said main member also having generally parallel side panels dependent from said top region to define therewith front wheel wells and fenders, narrowed portions of the top regions and said side panels being extended rearwardly beyond the hood to provide rear wheel wells and fenders and to define therebetween a rider space; a drawn front panel member telescoped upwardly within the front of the main member and having side and top margins generally conformed to the interior of said main body member and provided with edge flanges abutting the interior of at least said side panels and fender top regions, the top margin and major extent of the side margins being spaced rearwardly from the front edge of the main member, said flanges being spot welded to the main member to secure the panel member as a front closure and transverse beam element of the body; a roughly L-shaped one-piece seat member having an upright back with a rearward top flange and conformed at opposite sides from said top flange toward the bottom to the interior shape of said side panels and narrowed portions, and also having a forwardly extending bottom with dependent side flanges conformed to and welded to the side panels, as a transverse beam member, said top flange being welded to said narrowed portions; and means for closing the back of said body member rearward of said seat back.

7. The structure of claim 6 wherein a continuous inwardly rolled tubular bead is provided along the inner edge of said narrowed portions and dash board formation.

8. In a drawn sheet metal juvenile vehicle body, a basic body structure comprising: a one-piece main body member including a drawn hood formation and extending laterally therefrom front fender top regions, the hood formation including a top portion sloping forwardly from an elevation above the front fender top regions to a level below said regions to terminate in a front portion depressed entirely below the said regions and set back from the front edge of the main member, said main member having generally parallel side panels dependent from said top region to define therewith front wheel wells and fenders, narrowed portions of the top regions and also said side panels being extended rearwardly beyond the hood to provide rear wheel wells and fenders and to define therebetween a rider space; a drawn front panel member having side and top flanges conformed to the interior shape of said side panels and fender top regions and having a center portion received up behind the depressed hood front; the top flanges, said center portion, and the major extent of the side margins being spaced rearwardly form the front edge of the main body member, said flanges and center portion being spot welded to the main member to secure the panel member as a front closure and transverse beam element of the body; a roughly L-shaped one-piece seat member having an upright back having a rearward top flange and conformed to opposite sides from said flanges toward the bottom to the interior shape of said side panels and narrowed portions, and also having a forwardly extending bottom with dependent side flanges conformed to and welded to the side panels as a transverse beam member, said top flange being welded to said narrowed portions; and means for closing the back of the said body member rearward of said seat back.

9. A structure as set forth in claim 8 wherein the areas between the side panels and the front fender top regions and said narrowed portions is devoid of drawn formations in the metal.

*10. In a drawn sheet metal juvenile vehicle body, a basic body structure comprising: a one-piece main body member including a drawn hood formation and extending laterally therefrom front fender top regions, said main member having generally parallel side panels dependent from said top region to define therewith front wheel wells and fenders, said side panels being extended rearwardly beyond the hood to define therebetween a rider space; a drawn front panel member having side and top margins generally conformed to the interior of said main body member, the top margin and substantial extent of the side margins being spaced rearwardly from the front edge of the main member, means for attaching said said front panel member to the main member to secure the panel member as a front closure and transverse beam element of the body; a roughly L-shaped seat member having an upright back, said back being conformed at opposite sides to the interior shape of said side panels, said seat member also having a forwardly extending bottom conformed to and attached to the side panels as a transverse beam member, and means for closing the back of said body member rearward of said seat back.*

*11. The structure of claim 10, wherein said main member has a centrally depressed front portion and has along its front edge a continuous inward roll formation extending upwardly along the side panels over the front fender top regions and across said depressed front portion of the hood formation to aid in concealing the region of attachment of the front panel to the main member.*

*12. The structure of claim 10, wherein said means*

*comprises a drawn rear panel having forwardly flanged opposite ends conformed and attached to the interior shape of the back ends of the rearwardly extended side panels.*

*13. The structure of claim 12 wherein the front and rear panels have bumper simulating outward formations carried around the ends thereof, and the front and rear edges of the side panels have inward channel formations adapted to receive the bumper formations at the ends of the panels.*

*14. In a drawn sheet metal juvenile vehicle body, a basic body structure comprising: a one-piece main body member including a drawn hood formation and extending laterally therefrom front fender top regions, said hood formation terminating rearwardly in and transversely rigidified by an integral rearwardly sloping dash board formation, said main member also having generally parallel side panels dependent from said top region to define therewith front wheel wells and fenders, said side panels being extended rearwardly beyond the hood to define therebetween a rider space; a drawn front panel member telescoped upwardly within the front of the main member and having side and top margins generally conformed to the interior of said main body member, the top margin and substantial extent of the side margins being spaced rearwardly from the front edge of the main member, means for attaching said front panel member to the main member to secure the panel member as a front closure and transverse beam element of the body; a roughly* L*-shaped seat member having an upright back conformed at opposite sides to the interior shape of said side panels and also having a forwardly extending bottom conformed to and attached to the side panel as a transverse beam member; and means for closing the back of said body member rearward of said seat back.*

*15. The structure of claim 14 wherein a continuous inwardly rolled tubular bead is provided along the inner edge of said dash board formation.*

*16. In a drawn sheet metal juvenile vehicle body, a*

*basic body structure compirsing: a one-piece main body member including a drawn hood formation and extending laterally therefrom front fender top regions, the hood formation including a top portion sloping forwardly from an elevation above the front fender top regions to a level below said regions to terminate in a front portion depressed entirely below the said regions and set back from the front edge of the main member, said main member having generally parallel side panels dependent from said top region to define therewith front wheel wells and fenders, said side panels being extended rearwardly beyond the hood to define therebetween a rider space; a drawn front panel member conformed to the interior shape of said side panels and fender top regions and having a center portion received up behind the depressed hood front; said center portion and the substantial extent of the side margins being spaced rearwardly from the front edge of the main body member, means for attaching said front panel member to the main member to secure the panel member as a front closure and transverse beam element of the body; a roughly* L*-shaped seat member having an upright back and conformed at opposite sides to the interior shape of said side panels, and also having a forwardly extending bottom conformed to and attached to the side panels as a transverse beam member; and means for closing the back of the said body member rearward of said seat back.*

References Cited in the file of this patent or the original patent

UNITED STATES PATENTS

| | | |
|---|---|---|
| 1,442,912 | Stoddard | Jan. 23, 1923 |
| 1,547,516 | Neff | July 28, 1925 |
| 2,036,813 | Kraeft | Apr. 7, 1936 |
| 2,192,534 | Snell | Mar. 5, 1940 |
| 2,633,378 | Kraeft | Mar. 31, 1953 |
| 2,814,524 | Porsche et al. | Apr. 1, 1954 |
| 2,953,409 | Barenyi | Sept. 20, 1960 |